(12) United States Patent
Libby et al.

(10) Patent No.: US 7,674,169 B2
(45) Date of Patent: Mar. 9, 2010

(54) RANDOM ANIMATED LOTTERY SYSTEM

(75) Inventors: Budd O. Libby, Atlanta, GA (US);
Daniel W. Bower, Atlanta, GA (US);
Michael G. Fisk, Newport, RI (US)

(73) Assignee: Scientific Games International, Inc., Newark, DE (US)

( * ) Notice: Subject to any disclaimer, the term of this patent is extended or adjusted under 35 U.S.C. 154(b) by 1587 days.

(21) Appl. No.: 10/218,155

(22) Filed: Aug. 12, 2002

(65) Prior Publication Data

US 2003/0027621 A1    Feb. 6, 2003

Related U.S. Application Data

(63) Continuation-in-part of application No. 09/900,235, filed on Jul. 6, 2001, now Pat. No. 6,592,454.

(51) Int. Cl.
*G06F 19/00* (2006.01)
(52) U.S. Cl. ....................................................... 463/17
(58) Field of Classification Search ................... 463/16, 463/6, 40, 42, 43, 17, 22, 31, 35; 273/139, 273/269, 144 R, 144 A, 144 B; 379/93.13
See application file for complete search history.

(56) References Cited

U.S. PATENT DOCUMENTS

| | | | |
|---|---|---|---|
| 4,257,107 A | | 3/1981 | Heymsfield et al. |
| 4,288,077 A | | 9/1981 | Rose et al. |
| 4,339,798 A | * | 7/1982 | Hedges et al. ................ 463/26 |
| 4,429,877 A | | 2/1984 | Coppock |
| 4,494,197 A | | 1/1985 | Troy et al. |
| 4,540,174 A | | 9/1985 | Coppock |
| 4,689,742 A | | 8/1987 | Troy et al. |
| 4,752,836 A | * | 6/1988 | Blanton et al. ................ 386/84 |
| 4,795,161 A | * | 1/1989 | Chao .......................... 273/292 |
| 4,873,585 A | | 10/1989 | Blanton et al. |
| 4,883,636 A | | 11/1989 | Fantle, Jr. |
| 4,951,039 A | | 8/1990 | Schwendeman et al. |
| 5,035,422 A | | 7/1991 | Berman |
| 5,069,453 A | | 12/1991 | Koza et al. |
| 5,212,636 A | | 5/1993 | Nakazawa |
| 5,264,933 A | * | 11/1993 | Rosser et al. ................ 348/578 |
| 5,283,734 A | | 2/1994 | Von Kohorn |
| 5,286,023 A | * | 2/1994 | Wood .......................... 463/20 |
| 5,297,802 A | * | 3/1994 | Pocock et al. ................. 463/19 |
| 5,351,970 A | * | 10/1994 | Fioretti ....................... 463/19 |
| 5,354,069 A | | 10/1994 | Guttman et al. |
| 5,380,007 A | * | 1/1995 | Travis et al. ................... 463/18 |

(Continued)

FOREIGN PATENT DOCUMENTS

AU    712279    11/1999

(Continued)

*Primary Examiner*—Ronald Laneau
*Assistant Examiner*—Tramar Harper
(74) *Attorney, Agent, or Firm*—Dority & Manning, P.A.

(57) ABSTRACT

A lottery system graphically portraying a lottery result in animation is provided. The lottery system includes a game generator which comprises a random number generator and an animation drawing subsystem. The random number generator randomly selects a lottery result at a predetermined time. The animation drawing subsystem selects one or more game events associated with the randomly selected lottery result, and compiles into an animated lottery game video one or more animation sequences corresponding to the selected game events.

26 Claims, 8 Drawing Sheets

U.S. PATENT DOCUMENTS

| | | | |
|---|---|---|---|
| 5,380,206 A * | 1/1995 | Asprey | 434/257 |
| 5,411,258 A * | 5/1995 | Wilson et al. | 463/6 |
| 5,415,416 A | 5/1995 | Scagnelli et al. | |
| 5,518,239 A | 5/1996 | Johnston | |
| 5,569,082 A | 10/1996 | Kaye | |
| 5,590,879 A * | 1/1997 | Tripp | 273/144 R |
| 5,722,890 A * | 3/1998 | Libby et al. | 463/17 |
| 5,938,200 A | 8/1999 | Markowicz et al. | |
| 6,012,984 A | 1/2000 | Roseman | |
| 6,033,308 A | 3/2000 | Orford et al. | |
| 6,168,521 B1 * | 1/2001 | Luciano et al. | 463/18 |
| 6,193,605 B1 * | 2/2001 | Libby et al. | 463/17 |
| 6,280,324 B1 | 8/2001 | Tenenbaum | |
| 6,280,328 B1 * | 8/2001 | Holch et al. | 463/42 |
| 6,311,976 B1 | 11/2001 | Yoseloff et al. | |
| 6,331,143 B1 | 12/2001 | Yoseloff | |
| 6,358,150 B1 * | 3/2002 | Mir et al. | 463/28 |
| 6,478,676 B1 | 11/2002 | Dayan | |
| 6,530,842 B1 * | 3/2003 | Wells et al. | 463/46 |
| 6,585,590 B2 | 7/2003 | Malone | |
| 6,592,454 B2 * | 7/2003 | Libby et al. | 463/6 |
| 6,921,331 B2 | 7/2005 | Gatto et al. | |
| 6,955,604 B1 * | 10/2005 | Graves et al. | 463/42 |
| 2001/0003100 A1 * | 6/2001 | Yacenda | 463/41 |
| 2002/0010012 A1 | 1/2002 | Dayan et al. | |
| 2003/0087683 A1 * | 5/2003 | Gatto et al. | 463/6 |
| 2003/0171986 A1 | 9/2003 | Itkis et al. | |

FOREIGN PATENT DOCUMENTS

| | | |
|---|---|---|
| AU | 199930163 A1 | 1/2000 |
| AU | 200211974 | 8/2002 |
| WO | WO 94/13374 | 6/1994 |
| WO | WO01/08761 | 2/2001 |
| WO | WO02/45808 | 6/2002 |

* cited by examiner

FIG. 7

RANDOM ANIMATED LOTTERY SYSTEM

CROSS-REFERENCE TO RELATED APPLICATIONS

This application is a continuation-in-part, and claims the benefit, of U.S. application Ser. No. 09/900,235, filed Jul. 6, 2001 now U.S. Pat. No. 6,592,454 and entitled "IMPROVED LOTTERY SYSTEM".

FIELD OF THE INVENTION

The present invention relates to computerized wagering or lottery systems, and more particularly to a lottery or wagering system that graphically portrays the game in animation (or video).

BACKGROUND OF THE INVENTION

Many states have used lottery or on-line games, such as number games (for example, Pick 3, Pick 4, Lotto, Mega Millions, etc.) and "instant winner" games, as an added source of revenue. These games have become quite popular and successful.

One type of state-run lottery game involves the use of numerous remote computer stations located in stores throughout the state which communicate with a central computer. A customer seeking to play the game may mark the numbers he wishes to enter as his choices on a computer scannable or readable entry form. The customer pays the entry fee, usually no more than a few dollars, and the store clerk feeds the entry form into a card reader controlled by a lottery computer station or terminal, which registers the numbers selected and an ID number in the central computer. Alternatively, the customer may choose several numbers, and the store clerk may enter the chosen numbers into the lottery computer by operating a keypad. In another variation, the customer may elect a Quick-Pick option that provides for random selection of the customer's numbers by a computer.

After wagering has been closed to new entries, a carefully monitored selection committee chooses the winning numbers. This may involve, for example, operating a machine loaded with balls having eligible numbers marked thereon to select at random the appropriate number of balls. This selection process often is broadcast on local television stations so that contestants can watch to see if their numbers have been selected.

Integrity of the winner selection process significantly increases the cost of running these lotteries. For example, each drawing requires several individuals (e.g., a host or hostess, an auditor, a camera crew, and a set-up crew) to be present. A television studio equipped with camera and lighting equipment also is needed.

In addition, states and other entities running such lottery games have experienced some difficulties in increasing the number of interested day-to-day participants, and in maintaining the day-to-day interest of those who do participate on a regular basis.

As a result, a need exists for an automated lottery game which complies with government regulations without requiring extensive commitment of human and other resources, and which also enhances the intrinsic excitement of the game, in order to maintain and preferably increase the playing population.

SUMMARY OF THE INVENTION

The present invention overcomes these and other disadvantages of prior games and provides a game generator for an animated lottery game, which comprises, according to one embodiment, an animation drawing subsystem. The animation drawing subsystem selects one or more game events associated with a randomly selected lottery result, and compiles into an animated lottery game video one or more animation sequences corresponding to the selected game events.

This disclosure also provides a lottery system graphically portraying a lottery result in animation, which comprises, in one embodiment, the game generator and at least one lottery terminal configured to provide lottery game parameters to a player for selection. After closing participation to additional entrants or players, a lottery result comprising, for example, a sequence of numbers is randomly selected. The animation drawing subsystem selects one or more game events associated with the randomly selected lottery result, and compiles pre-recorded video elements into an animated lottery game video with one or more animation sequences corresponding to the selected game events. The animated lottery game may be broadcasted.

According to one embodiment, the animation drawing subsystem retrieves selected graphical components from a library of animation elements, virtual images and/or recorded video images, and applies a compositing process to the selected graphical components to generate the animation sequences corresponding to the selected game events. Each game event may be associated with a plurality of combinations of the graphical components stored in the library of animation elements, virtual images and/or recorded video images. The animation drawing subsystem selects, for each selected game event, one of the corresponding combinations. The animation sequences may include a plurality of graphic components, and a compositing process is repeatedly applied to the graphic components to produce the animation sequence. The game controller may concatenate the selected animation sequences. The concatenated animation sequences preferably are contiguous and seamless.

The animated lottery game video may include overlay of one or more video segments with the animation sequences. The animated lottery game video may include one or more voice overlays and/or audio tracks. For example, the animated lottery game video may include announcement of the lottery result by a real person in one or more video segment.

A game generator, according to one embodiment, may comprise an animation drawing system, wherein the animation drawing subsystem selects one or more animated game events associated with a randomly selected lottery result, and compiles into an animated lottery game video the animated game events along with one or more pre-recorded video segments of an announcement of the lottery result by a real person. The lottery result may be randomly selected by, for example, a random number generator at a predetermined time. The random number generator may be integrated with the game generator or provided elsewhere. Also, the randomly selected lottery result may be supplied by another source.

The game generator may further comprise a user interface. The user interface may provide means for managing and configuring the library of animation elements and virtual images, means for customizing graphical components, means for configuring and/or customizing the compositing process, and/or means for synchronizing voice overlays and/or audio tracks with animation sequences and/or video segments.

Also, the game generator may maintain an archive of lottery game results, and the user interface may provide means for obtaining statistics and/or historical data from the archive. The game generator may automatically store the animated lottery game video in the archive.

The lottery system may further comprise a lottery server coupled to the lottery client terminals through one or more computer and/or telecommunicative networks. The lottery server also may be coupled to the game generator to trigger the random selection of the lottery result by the random number generator. The animated lottery game video may be posted and available to the lottery client terminals on demand through a computer or telecommunicative network. The game generator may further comprise a communication interface configured for communicating the animated lottery game video to the lottery client terminal for display.

The animated lottery game may be an animated race, a virtual ball draw, an animated playing card game, an animated lucky date game, an animated version of a popular game, etc., alone or in combination with a video of a real person announcing the game winner.

The invention also provides a method of conducting a lottery game graphically portrayed in animation, comprising of providing game parameters to a player for selection, randomly selecting a lottery result and selecting one or more game events corresponding to the randomly selected lottery result, retrieving selected animation sequences according to the selected game events, and compiling the retrieved animation sequences into an animated lottery game video.

BRIEF DESCRIPTION OF THE DRAWINGS

The above and numerous other objectives, features and advantages that may be achieved by the subject matter of the present invention may be more readily understood from the following detailed description of the preferred embodiments by referring to the accompanying drawings wherein.

DETAILED DESCRIPTION OF THE INVENTION

The present invention provides tools (in the form of systems, apparatuses and methodologies) for automating and animating lottery games, which may be used to avoid the expenses of allocating facility, equipment and a staff of individuals to each lottery drawing.

The types of lottery games contemplated by the present invention include games where the player can select pre-defined game parameters, such as characters, letters or numbers.

According to an exemplary embodiment, a player selects (or obtains through a Quick-Pick) a subset of K numbers (which may be sequence-specific or not) from a predetermined set of integers. K is predetermined and the number of integers in the set may be larger than or equal to K. The selected numbers may be either non-repeating (i.e. mutually exclusive) or repeating (i.e. a number may appear more than once in the selected sequence). When the selected numbers must be non-repeating they may correspond to, for example, horses in one horse race for a win, place, show, quinella, exacta/perfecta or trifecta bet. When the numbers may be repeating they may correspond to, for example, selected horses in K respective horse races for a series bet.

The player typically is issued a ticket identifying the K numbers which were selected. Each issued ticket may be assigned a unique multi-digit identifier which identifies the ticket with the selected numbers. The identifiers of all issued tickets are stored for selective retrieval. After wagering is closed, a winning combination of K numbers is randomly selected. A grand prize may optionally be provided. According to one embodiment, the identifiers of all issued tickets bearing the winning numbers are selectively retrieved. One of the retrieved identifiers may be randomly selected to determine a grand prize winner. Alternatively, the grand prize winner may be selected from the pool of all players of the lottery game.

The games may take place periodically at virtually any interval, e.g., one-game-per-minute, one-game-per-five-minutes, one-game-per-day, one-game-per-week, etc. If the games are broadcasted on public, cable or satellite television, the frequency of broadcasted games, of course, depends in part on program scheduling of the television station.

In order to avoid the expense of allocating facility, equipment and a staff of individuals to each drawing, the lottery drawing may be automated and the results of the drawing graphically portrayed in animation and/or in video, as a virtual ball draw, an animated racing game, or animation of other popular games. Optionally, announcement of the winning numbers (or other game parameters) by a real person in one or more pre-recorded video segments may be associated with the animated game result. Accordingly, a computerized lottery or wagering system embodying the subject matter of this disclosure includes a game generator which provides random selection of the winning combination and compilation of an animated lottery game video.

Figure 1A:
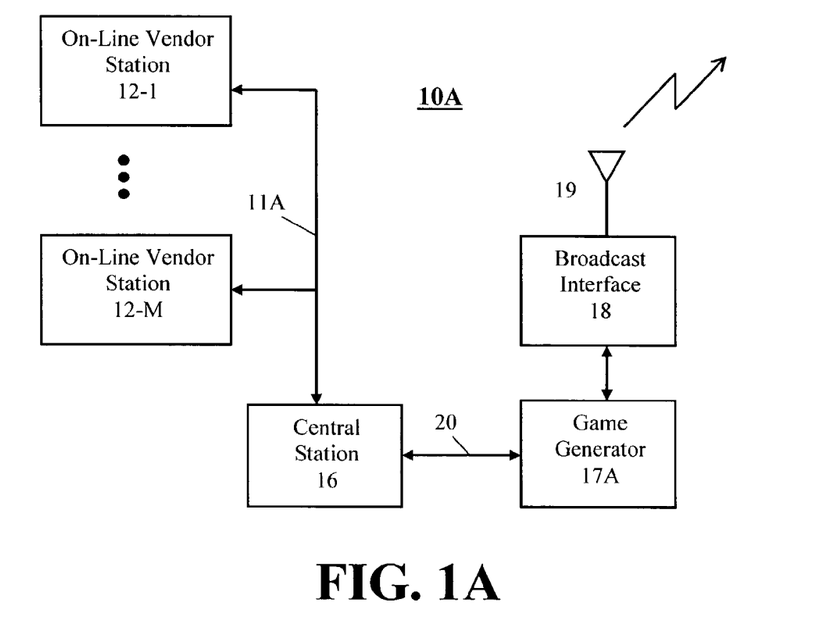
FIG. 1A is a block diagram of a lottery system, according to one embodiment of the present invention.

A block diagram of a lottery system, according to one embodiment, is shown in FIG. 1A. Lottery system 10A includes a plurality of remote on-line vendor stations 12 that are linked over a wide area network (WAN) 11A to a central station (or server) 16. A game generator 17A is connected to the central station 16 over a computer or telecommunicative network 20. In the embodiment corresponding to FIG. 1A, the central station 16 acts as an interface between the game generator 17A and the remote on-line vendor stations 12. As a result, the game generator can connect to existing lottery systems having a plurality of remote on-line vendor stations connected to a central station (or server). The central station serves as a communication interface for transferring the selected game parameters from the remote vendor stations to the game generator, and for transferring data regarding the winning results from the game generator to the remote vendor stations.

In another embodiment, the game generator may communicate directly with the remote vendor stations. In an embodiment corresponding to FIG. 1B, game generator 17B in lottery system 10B is connected directly to a plurality of remote vendor stations 13 via WAN 11B (or the Internet). The game may be transmitted via, for example, a closed circuit television line. In this embodiment (FIG. 1B), the system does not need to be connected to an existing lottery system.

Figure 1B:
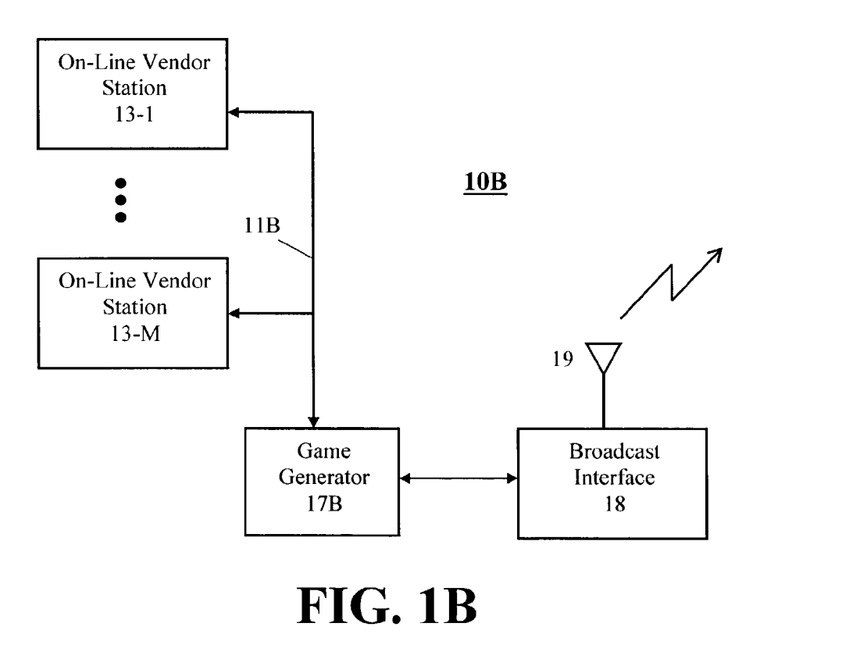
FIG. 1B is a block diagram of a lottery system, according to another embodiment of the present invention.

In the embodiments exemplarily shown in FIGS. 1A and 1B, the plurality of remote vendor stations are configured to provide predetermined game parameters to a player for selection using one or more input devices such as, for example, a keyboard or key pad. Typically, the selected game parameters are entered by an operator of the remote vendor station. Alternatively, if a kiosk type of remote station is used, the player can directly select the game parameters. The remote stations transfer the selected game parameters to the game generator either directly (FIG. 1B) or via the central station (FIG. 1A).

Figure 1C:
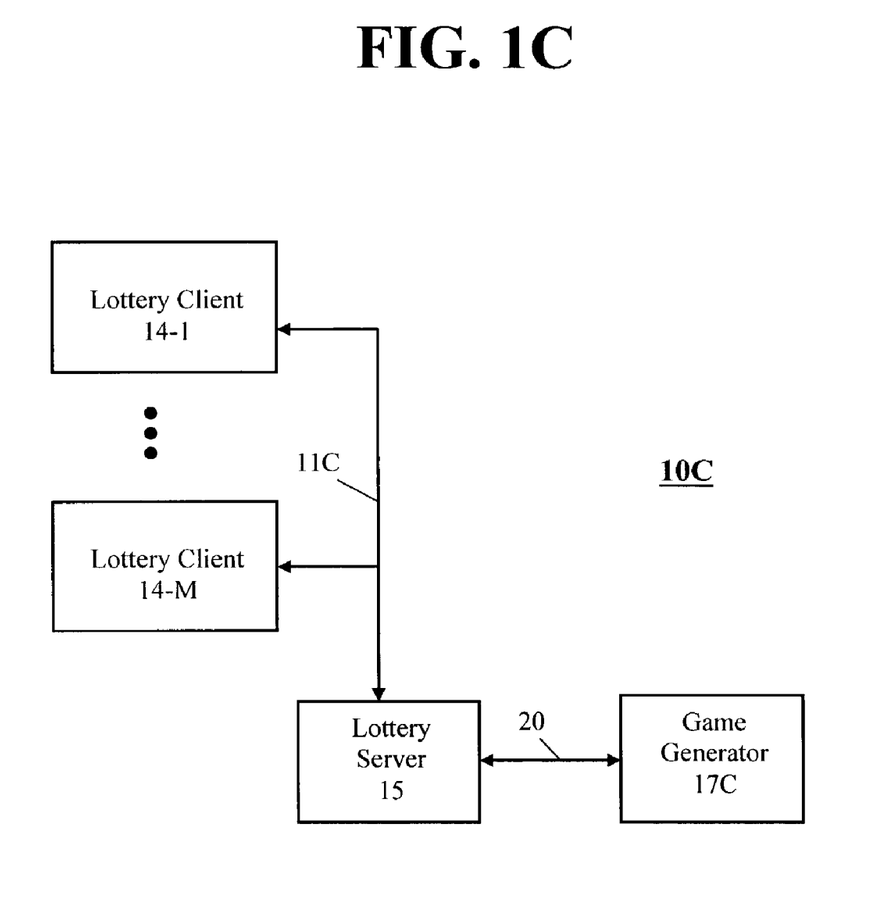
FIG. 1C is a block diagram of a lottery system, according to a third embodiment of the present invention.

According to another embodiment, the game generator may be integrated in a client-server lottery system (FIG. 1C). Lottery service is provided by a lottery server 15, across WAN 11C, to a plurality of lottery clients 14. Game generator 17C is coupled to lottery server 15. A client terminal may have a display, on which game parameters are displayed for selection, and one or more input facilities, such as a keypad, interactive voice interface, etc., which allows game parameters to be selected.

Figure 2A:
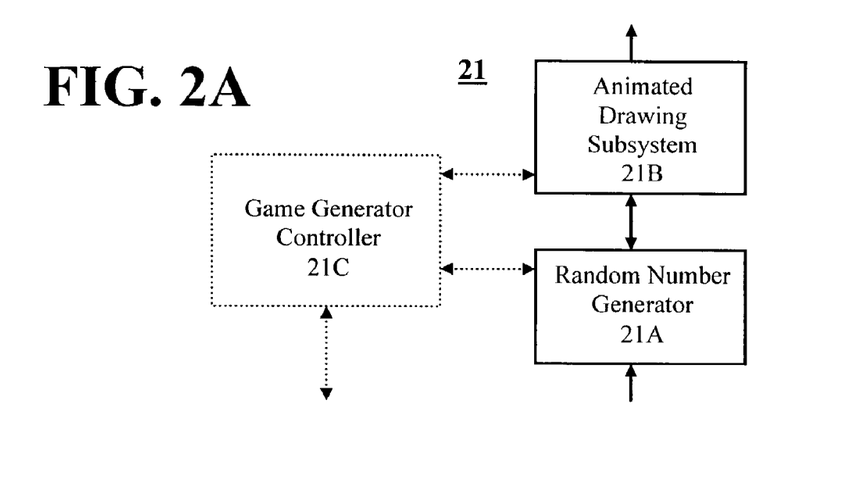
FIG. 2A is a block diagram of a game generator, according to one embodiment of the present invention.

The game generator preferably is a random, animated digital drawing system (RADDS). As shown in FIG. 2A, RADDS 21 includes a random number generator 21A, an animated drawing subsystem (ADS) 21B and an optional game generator controller 21C.

The random number generator may be a hardware based number generator or a program based number generator, and either stand alone or integrated into the game generator. Alternatively, an operator can randomly select the winning numbers and enter the numbers via a keyboard.

The random number generator can select any number of picks from a set of numbers. For example, with 15 numbers in the set, the random number generator can draw anywhere from 1 to 15 numbers from the set. Also, the random number generator can select either non-repeating numbers or a sequence that includes numbers that may repeat. Thus, the random number generator may be used for any of the popular numbers games, such as Pick 3, Pick 4, Lotto, Power Ball, etc., or variants thereof. In any event, the randomly selected numbers provide the basis for compiling animated lottery results. For example, in a game with numbers that may repeat, the K randomly selected numbers may correspond to, for example, winning horses in K respective animated races.

The ADS 21B (FIG. 2A) includes a library of virtual images, animation elements and/or recorded video images. In the embodiments corresponding to FIGS. 1A-1C, at a predefined time for each corresponding game, selection of game parameters is ended for the game. The random number generator, automatically or when specified by an operator, randomly selects the winning combination of numbers. After the winning combination is selected, the winning combination is associated with a game event (for example, the win, place and show horses in a virtual horse race game). Next, selected virtual images and animation elements corresponding to the winning combination and associated game event are retrieved and composed into animation sequences corresponding to the game event.

For example, the animated lottery game may be fashioned as an animated, virtual ball draw. As mentioned above, drawings for lotto games are often conducted by using a machine loaded with numbered plastic balls. However, the expense of undertaking such conventional ball drawings is great since a collection of audio-video equipment and a staff of personnel must be allocated for each drawing. The virtual ball draw does not require such expense and resource allocation, after the initial setup, since it can be automated. Further, automation of the drawings also facilitates auditing and archiving, since human input is removed from the automated process.

When the winning combination of game parameters (e.g., numbers) is randomly selected, animation segments corresponding to the numbers in the winning combination are retrieved from the library of the ADS 21B, and the animation segments are composed into a video sequence. Thus, if, for example, the winning sequence of "9", "3", and "7" is selected for a Pick 3-type lottery game, an animation segment corresponding to virtual draw of a number nine ball, an animation segment corresponding to virtual draw of a number three ball, and an animation segment corresponding to virtual draw of a number seven ball are retrieved from the library and appended one to another to provide a virtual draw of the nine, three and seven balls in sequence. In order to provide some variety, the library may store a number of variations of the virtual drawing of each numbered ball. For example, color and design may vary. When the number nine appears in the winning combination, one of the plural animation segments corresponding to virtual drawing of the number nine ball is selected and retrieved from the library.

In addition, the ADS 21B may optionally include a real people announcement component, and the animated lottery game video thereby includes announcement of the winning combination by a real person in one or more pre-recorded video segments. For example, for each game parameter number, announcement by a real lottery spokesperson of selection of the number for a winning combination may be pre-recorded in a video segment, and the video segment is stored in the library. Further, the video segment may be associated with the animation segment (also stored in the library) corresponding to the virtual draw of the corresponding numbered ball, and when the animation segment is retrieved, the associated video segment of the real person announcement is also retrieved. The virtual ball draw and the real person announcement may be displayed simultaneously (and synchronously), for example, in a split screen.

As another example, the game may be graphically portrayed in animation as a race wherein the game parameters are numbers associated with the participants in the race. Each race has a number of race participants equal to the number of integers in the set and respectively designated by corresponding integers of the set. Examples of some games contemplated include (without limitation) horse races, dog races, car races and motorcycle races. An animation sequence representing one race in the case of non-repeating numbers in the sequence-specific subset, or K races in the case of repeating numbers in the sequence-specific subset, is generated and, after all the tickets are issued, may be broadcasted. As with the virtual ball draw, the animation sequence optionally may be integrated with announcement of the winning sequence by a real person in one or more pre-recorded video segments.

An exemplary embodiment described below comprises an animated horse racing game wherein players have three ways in which to win: 1) picking the win, place or show horse; 2) picking the win and place horses in exact order of finish (a perfecta or exacta) or in either order of finish (a quinella); and 3) picking the win, place and show horses (a trifecta). The players eligible for the grand prize may be only the trifecta winners. Alternatively, all winners or all players may be eligible for the grand prize.

Each game event may be randomly selectable by the game generator. If the game event is, for example, a horse race with twelve participating horses, the game generator may store, according to one embodiment, an animated race for each win, place and show combination selected from the twelve horses. After the winning sequence of numbers is randomly selected, the game generator may retrieve a randomly selected animation sequence of a race associated with the selected winning numbers.

In embodiments in which animated game events are broadcasted (for example, corresponding to FIGS. 1A and 1B), the animation sequence corresponding to the selected game event may be retrieved, formatted for broadcast, and broadcasted using standard television transmission techniques via, for example, RF transmission, microwave transmission, fiber optic cabling or closed circuit television lines, so that the players can watch the game on a television and root for their selections. In addition, the system determines which players are eligible for a grand prize pool and after the broadcast of the game announces the grand prize winner.

To broadcast the animation sequence of the game, the game generator may be connected to a broadcast interface 18 which formats the animation sequence data for broadcast via antenna 19 (FIGS. 1A and 1B). In this configuration, the broadcast interface is configured for RF transmission of television signals. The video is transferred in accordance with known RF transmission methods. Alternatively, the broadcast interface can be configured to format the video data for microwave transmission to satellites and reception by the public on conventional satellite dishes. In another alternative configuration, the broadcast interface can be configured to transmit the video along fiber optic cabling or on closed circuit television lines. According to another embodiment, the broadcast and/or communication with the vendor stations may be through either a wired or wireless connection to the Internet. Similarly, in the embodiment corresponding to FIG. 1C, the video may be made accessible on demand to the clients through the WAN.

Figure 2B:
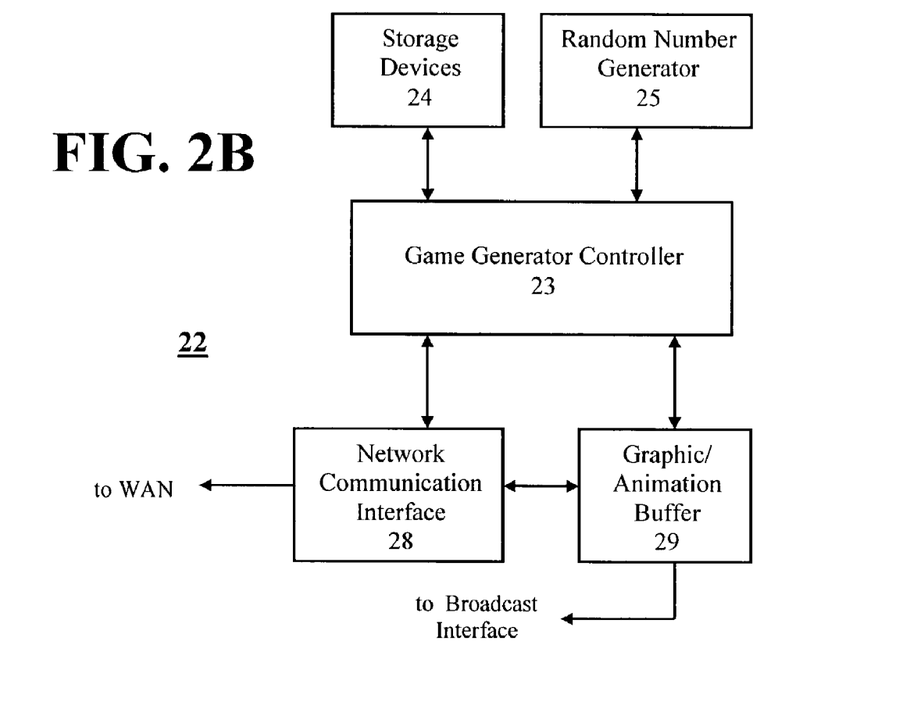
FIG. 2B is a block diagram of a game generator, according to an exemplary embodiment of the present invention.

A game generator according to one configuration will now be described with reference to FIG. 2B. Game generator 22 preferably includes a microprocessor-based game generator controller 23 and one or more storage devices 24. A random number generator 25 (similarly to the random number generator 21A in FIG. 2A) optionally may be included in the game generator 22, for randomly selecting the winning numbers.

The game generator controller 23, coupled with assorted software components, control operations and functionalities of the game generator. The controller 23 may be a suitably programmed microprocessor or microcontroller, an application specific integrated circuit (ASIC), a programmable logic device, or (as one skilled in the art should understand and appreciate) a collection of discrete components suitably laid out and connected on a printed circuit board.

The software components may include hardware management functions, such as assorted device drivers, including a wireless communication driver if a wireless interface is provided.

In addition, the software components may include a user interface. The user interface provides means for managing and configuring the library of virtual images and animation elements offline. Further, a user, through the user interface, can customize the desired graphic elements (for example, logos, posted lottery results, etc.) to be displayed, as well as configure the animated drawing system.

The user can specify, through the user interface, that the animated lottery result is to be a compilation of video segments and animation sequence(s) and specify the timing of the video segments and animation sequences. For example, the animated lottery results may be announced and combined (such as spliced) with a winners' gallery video. Further, the user can specify that the animated lottery game video should be integrated with announcement of the lottery result by a real person in one or more pre-recorded video segments. As another example, in the case of a state-run lottery, the animated lottery game may be preceded by video segments which present the benefits obtained by state residents from lottery revenue (such as public education, state and local governments, law enforcement, etc.).

More advanced tools for customizing the look and feel of the animated lottery result may also be provided through the user interface. For example, the user interface may provide means (in the form of well-known graphical interface elements, such as tables, menus, buttons, drop-down lists, tabs, etc.) for specifying and/or selecting the parameters for compositing (or blending) the animation elements and virtual images. The user interface may also be used to configure special effects to be displayed. In addition, the user interface may be used to reserve a window within the display (for example, a virtual picture-in-picture) for showing other information. Thus, for example, the reserved window may show sports scores, stock market indices, etc.

Any of many well-known animation and compositing techniques (not discussed in detail herein, in the interest of clarity) may be provided and configured through the user interface, such that one or more virtual overlays of graphical (or other visual) information may be presented.

In addition, the animated lottery results may include one or more voice overlays and/or audio tracks. The user interface may also provide means for synchronizing the voice overlays and audio tracks with the animation sequences and video segments.

The storage devices may include one or a combination of buffers, registers and memories [for example, read-only memory (ROM), programmable ROM (PROM), erasable PROM (EPROM), electrically erasable PROM (EEPROM), non-volatile random access memory (NOVRAM), etc.]. Other storage devices may include, for example, floppy disk drive, CD (or DVD) drive, hard disk, and other mass storage devices. The storage devices may include a storage area network (SAN).

The storage devices store code and data for the game generator controller 23. For example, the storage devices may store programs, such as system and application programs, and provide sufficient storage capacity also to store numerous animation sequences associated with the particular game.

The storage devices may also store an archive of lottery game results. Such archive may provide an audit trial which facilitates audits of the system. In addition to the storage devices, analysis tools may be provided. The combination of the archive and analysis tools provides means for obtaining statistics and historical data.

The game generator 22 may operate through one or more wired or wireless networks and include a network communication interface 28 that is configured for bidirectional communications with the remote on-line vendor stations (and/or with a central station or lottery server). In a networked system, the network communication interface 28 may include interfaces for communicating electronically with one or more other terminals or data sources (for example, vendor stations or a lottery server) through telecommunicative or computer networks. Such networks may include the Internet, an intranet, an extranet, a LAN (local area network), a WAN (wide area network), a wireless network, a satellite network and other networks. For example, video sequences may be downloaded through the networks from a remote source (for example, a storage area network or a server). As another example, the software components may be received through the network communication interface, and each software component may comprise one or more segments.

In one embodiment (FIG. 2B), the network communication interface 28 includes a microprocessor-based communication controller, memory for storing data (for example, data to be transferred via the network, and valid data received from the network for subsequent transfer to the game generator controller) and programs (such as system and application programs), one or more modems and corresponding serial interfaces (the controller is coupled to the modems via the serial interfaces). Depending upon the communication requirements of the system (i.e., the communication traffic), there may be a number of modems and corresponding serial interfaces to accommodate a large number of remote player stations. The serial interfaces provide a serial data buffer to the communication controller.

In any event, the network communication interface 28 includes the appropriate conventional units for interfacing with the networks, including, for example, Ethernet card, modem, wireless modem, etc. Interfaces for such communication are well known. Therefore, the interfaces are not described in detail here.

As mentioned above, the lottery game may be portrayed as, for example, an animated horse race with twelve horses competing. Thus, for win, place and show results there are 1,320 possible winning combinations, i.e. 1,320 possible outcomes representing twelve horses taken three at a time. As a result, any one of 1,320 races can be broadcasted depending on the selected outcome.

To create high quality animated races, according to one embodiment, each of the twelve horses are modeled and animated and then combined with modeled and animated backgrounds to create the horse race. The animated race is then voiced over with a race call and crowd and horse background noise to provide a realistic horse race.

Modeling of the horses and jockeys may be accomplished by capturing the motions of real horses and jockeys on a treadmill using known motion capturing techniques. A computer may then be used to process the captured data and combine the captured motions with animated horses and jockeys. Once each horse and jockey are animated, the twelve horses are combined with the animated background to complete the animated race.

The modeling, according to another embodiment, may use inverse kinematics techniques. The skeletal structure of a horse is modeled, along with movement of joints corresponding to movement by the horse. The movement is thus replicated in animation.

Animation may be accomplished in accordance with a number of computer generated animation techniques, such as the methods disclosed in U.S. Pat. Nos. 4,951,039, 4,873,585 and 4,752,836, whose disclosures are incorporate here by reference.

The races preferably are stored in the storage devices 24 as segments of races, rather than complete races. The animation sequence, at the time of selection, is built from these segments to create preferably a contiguous, seamless video sequence and audio sequence of a race. In an exemplary embodiment a video sequence consists of four stages of segments. The available segments in the embodiment are in sets of 1 ("Lead In" stage), 660 ("Trunks" stage), 1,320 ("Branches" stage) and 3,960 ("Leaves" stage). The seams between adjoined segments in a video sequence may be implemented as a branching function. At each seam there is a common frame that allows a seamless transition to one of the appropriate segments in the following stage. In the exemplary embodiment, the Lead In segment passes seamlessly into a randomly selected one of six hundred sixty available Trunk segments; each Trunk segment into a randomly selected one of two appropriate Branch segments; and each Branch segment into a randomly selected one of three appropriate Leaf segments. Thus, the (three different) Leaf finishes for each predetermined win, place and show combination may be combined with different possible Branches and Trunks to enhance entertainment through randomization, where possible.

For example, if the sequence 5, 7, 9 is randomly selected as the winning win, place, show sequence, there may be three completely different finishes, not to mention assorted different intermediary Branches and Leaves, for the particular win, place, show combination. In addition, instead of having to animate, render and store 3,960 minutes (e.g., 3,960 different one-minute races, 1,320 different three-minute races, etc.) of video files for a twelve horse race, the exemplary embodiment described above requires only approximately 1,000 minutes.

When numbers in the selected winning sequence (of length K) may repeat, e.g., defining winning horses in K respective horse races, the video sequence that is compiled may comprise K races. Segmentation of each race preferably is also used in this configuration. The number of available segments in each stage may be different, since only the winner of each race is of interest. There should be even in this configuration a variety of available finishes (i.e. Leaf segments) that lead to each race result. However, when a number appears more than once in the randomly selected winning sequence of numbers, the selection of at least the Leaf segments for the races corresponding to that repeating number should be controlled so that the segment is not repeated in the video sequence of the K races.

After the winning sequence of numbers is randomly selected, by the random number generator or by an operator, and entered, the game generator controller 23 retrieves a predefined video sequence of the game (e.g., a horse race) from the storage devices 24 and prepares the video sequence for broadcast. As described above, the video sequence preferably comprises a plurality of stored segments. Thus, in the preferred embodiment, the game generator controller randomly selects for each stage of the video sequence one of the segments appropriate for that stage, and composes the selected segments for each stage into a seamless video sequence.

The video data is preferably in digital form and may be formatted by, for example, a graphic/animation buffer 29 for transfer to the broadcast interface and/or to network communication interface 28.

In a preferred embodiment, segments are rendered directly to a digital compressed format such as MPEG 2. This allows the stored video image to be a very high quality. At the time of broadcast, the segments are concatenated together and fed to the broadcast interface which typically transmits a NTSC compatible analog signal. MPEG 2 is the same format used by satellite transmitters such as Direct TV. When the broadcast is via satellite, the MPEG 2 files may be transmitted directly without having to be converted (i.e. decompressed). Also, the data may be transmitted in serial digital format.

Generally, each remote on-line vendor station is configured for operation by an operator, e.g., store personnel, or for operation directly by the player. The operator or player enters the game parameters, for example, the numbers of the respective win, place and show horses, and pays for the game at the site of the remote station. The entered game parameters are hereinafter defined as the player selection data.

Figure 3:
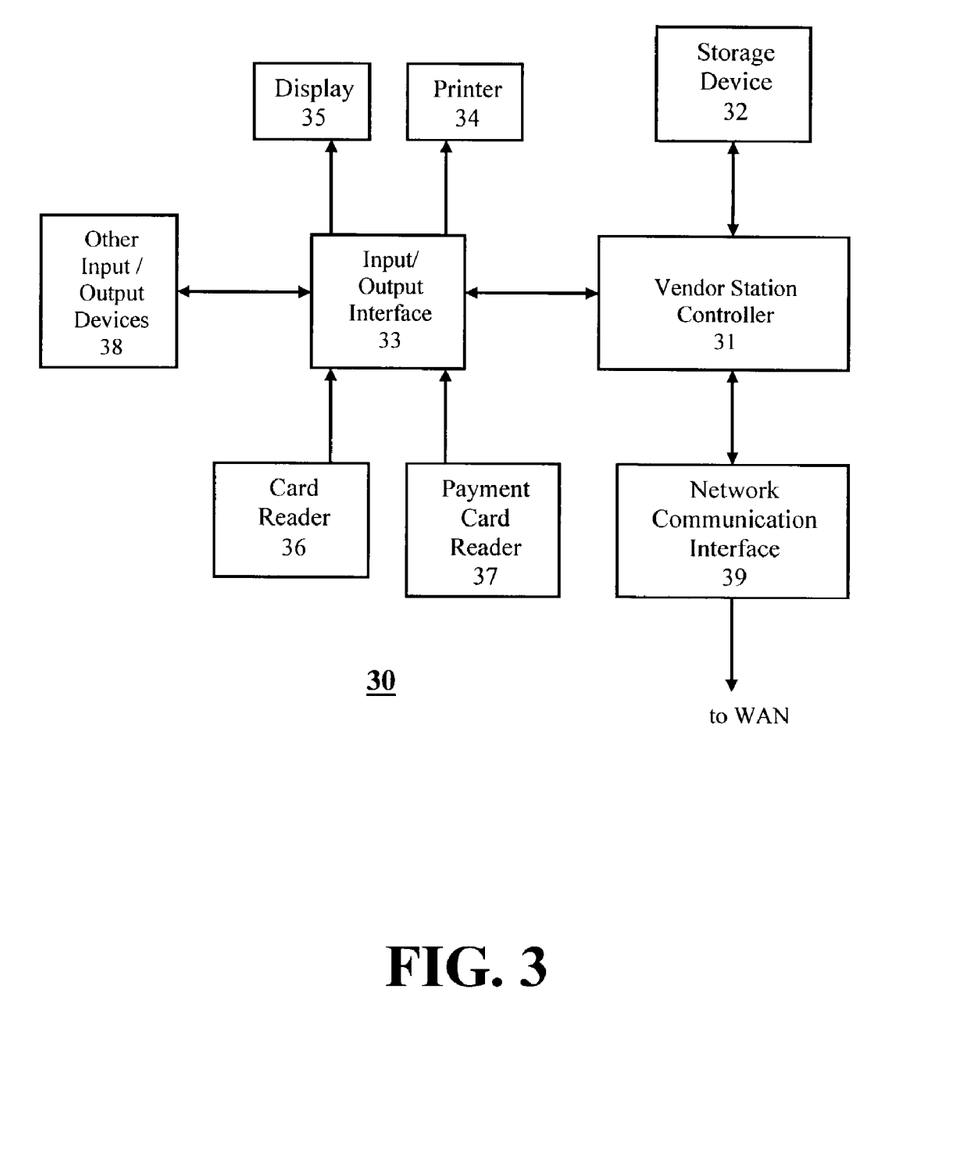
FIG. 3 is a block diagram of a remote station, according to an exemplary embodiment of the present invention.

FIG. 3 shows a block diagram of a remote on-line vendor station, according to an exemplary embodiment. Remote on-line vendor station 30 includes a controller-processor 31 connected to one or more storage devices 32 (such as RAM, ROM, other memory devices, and/or mass storage devices) for storing system and application programs. An input/output interface 33 couples the station controller 31 to assorted input/output devices, including a printer 34, a display 35 (such as a LCD display, a monitor and the like, to provide visual messages or prompts to the operator or player), a card reader 36, a payment card reader 37, or other input/output devices 38, such as keyboard, keypad, mouse, track ball, stylus, microphone, touchpad, touchscreen, speaker, etc., plus the appropriate device drivers.

As another example, a voice interface may be provided along with a microphone. Spoken words are picked up through the microphone and converted by applying speech recognition (software and/or hardware) technology. For example, a user, with visual prompt provided on the display, such as in the form of text and/or graphics, may give an oral command, which is then converted through speech recognition and triggers operation. Text-to-speech technology also may be integrated. Thus, a voice prompt also (or alternatively) may be provided.

Network communication interface 39 is connected to a wide area network and to the station controller 31 to facilitate data communication between the remote on-line vendor stations and the game generator, directly or via a central station.

The remote on-line vendor station may be configured for installation in, for example, a retail store and operated by personnel within the store. The player (or customer) selects, for example, the numbers of the respective win, place and show horses (i.e., the trifecta) and the operator can either enter the numbers via an input device such as a keyboard, a card reader or a voice interface, or elect the Quick-pick option for random selection of the numbers by a computer. Player selection data may be stored along with corresponding player identification data. The player identification data may be the player's social security number or other indicia which associate the player with the player selection data.

Figure 4:
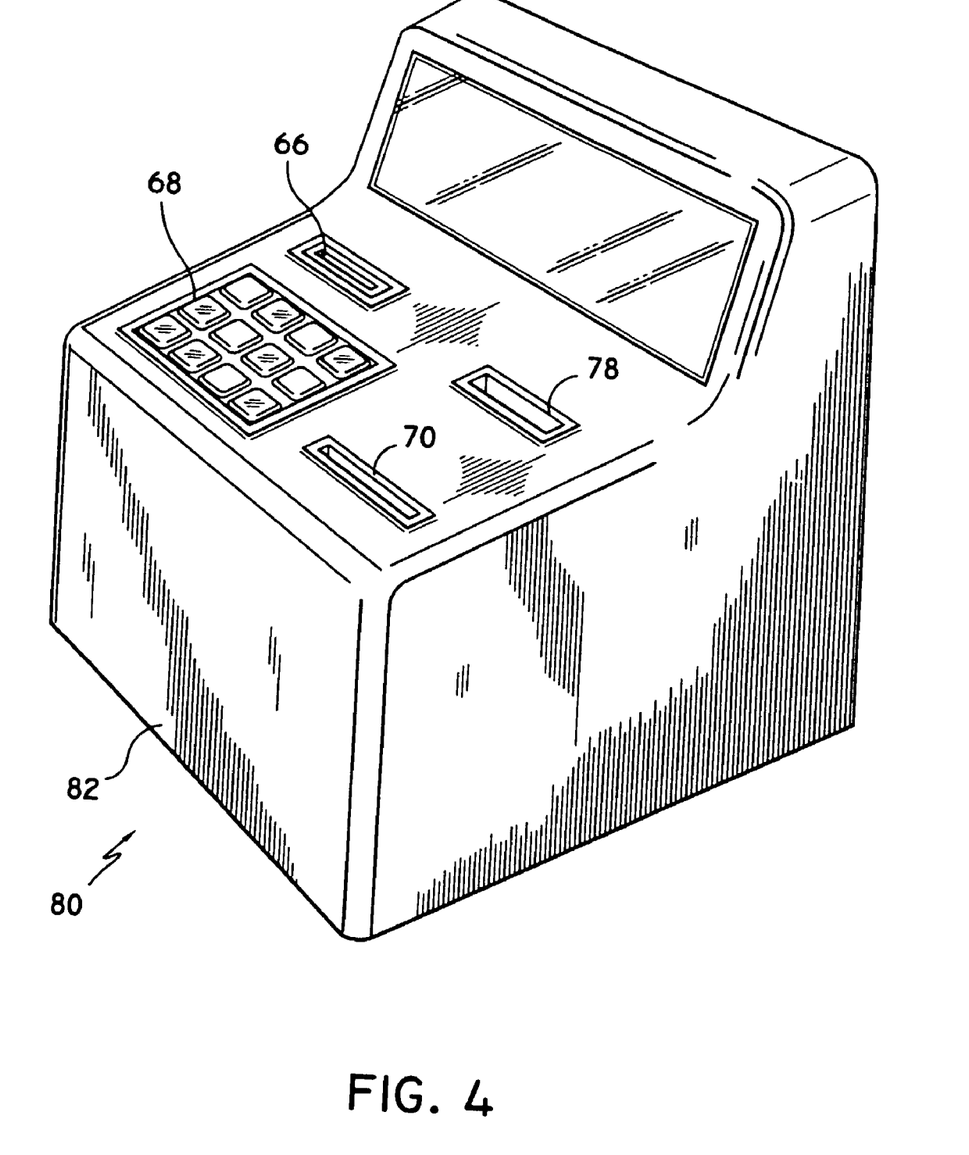
FIG. 4 is a perspective view of a kiosk-type remote station.

In an alternative configuration, a kiosk-type remote on-line station 80 is shown in FIG. 4. The internal components for the kiosk 80 are shown in FIG. 3. The kiosk 80 includes a stand alone housing 82 that may be located in public locations, such as shopping malls, and players can enter player selection data via an input device, such as a keyboard, a card reader, etc. In this embodiment, payment for the entry into the lottery may be made by cash or by a payment card medium, such as credit card, a debit card or the like, which is inserted into card reader 78. A ticket or receipt of the transaction is provided by the printer 34. It should be understood that the kiosk-type station may have many of the user interface features described above.

Figure 5:
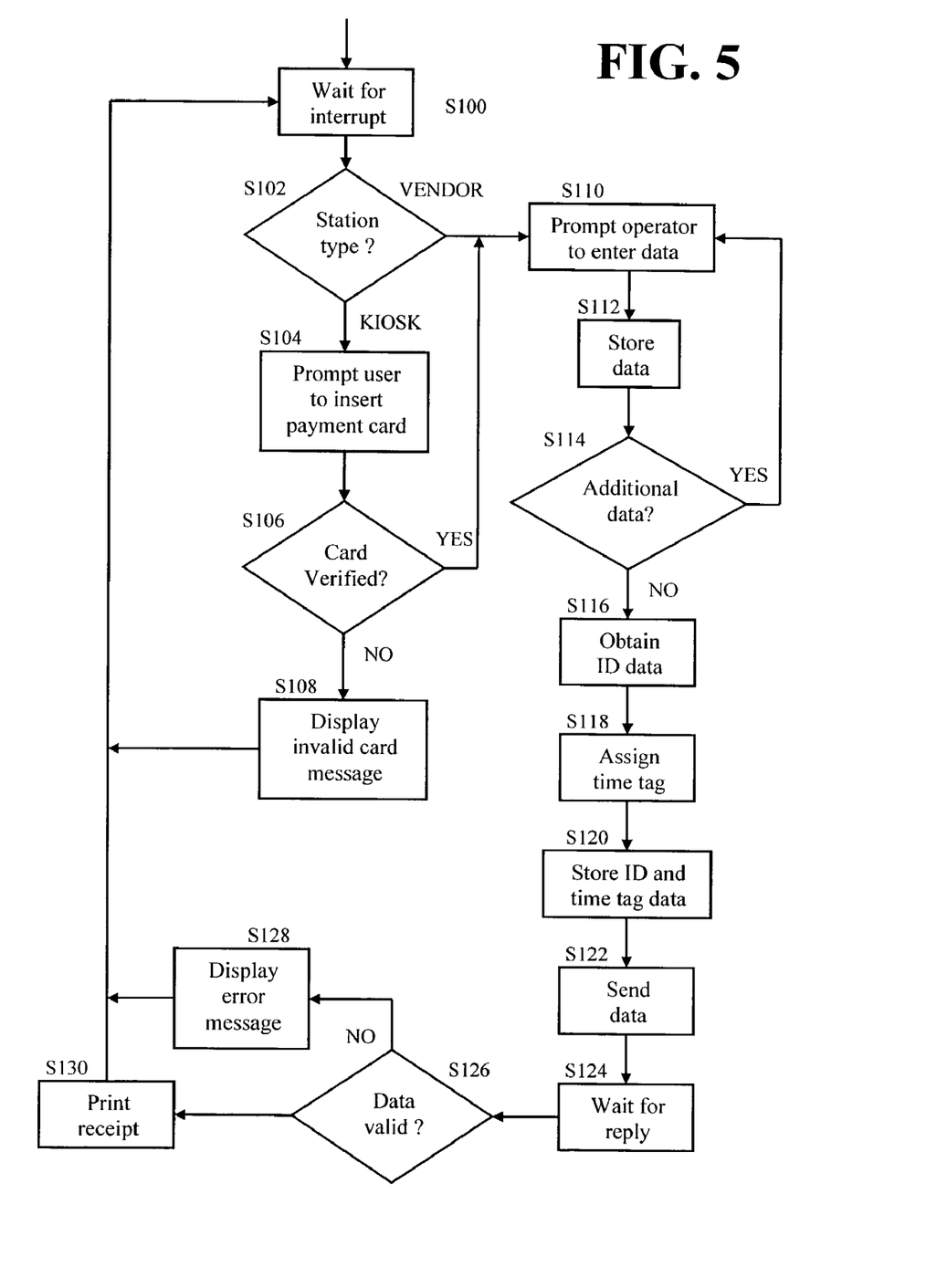
FIG. 5 is an exemplary flow diagram showing operation of the remote station of FIG. 3 or FIG. 4.

FIG. 5 is an exemplary flow diagram of the operation of the remote on-line vendor station. Initially, the remote station is maintained in an idle state in step 100 wherein the display 35 can be continuously updated to show, for example, statistical data and to provide instructions regarding how to enter player selection data. Once an interrupt is received by the station controller 31, the controller initiates a data entry routine. If the remote station is a kiosk (step S102, "KIOSK"), the player is prompted to insert a payment card into card reader 78 (steps 104). The station controller 31 then verifies that the card is valid by, for example, automatically contacting known credit agencies via the network communication interface 39 and receiving a code indicating whether the card is valid or not (step S106). If the card is invalid (step S106, "NO"), then the player is notified (step S108) that the transaction cannot be completed and the station returns to the idle state (step S100). If the card is valid (step S106, "YES"), the player is instructed to enter the player selection data (step 110). If the remote station is operated by an operator, the station prompts the operator to enter the player selection data which as noted above can be entered by a keyboard, a card reader, or another input device (step S110).

In any event, when the player selection data is entered, the station controller 31 stores the data in the storage devices 32, typically in RAM (step S112). In the horse race example, the numbers of the win, place and show horses are entered and stored (step S114). Once the player selection data is completely entered, the controller 31 instructs the operator to enter identification data which is associated with the player selection data for verification purposes in the event the player (a) chooses the correct win, place or show horse or (b) qualifies for and wins the grand prize (step S116). An example of player identification (ID) data is a social security number.

In addition to requesting player ID data, the station controller 31 retrieves the time of day and date (i.e., time tag data) from a clock (not shown) within the remote station (step S116) and associates the player selection data with a particular time and day for determining if the player has a winning ticket (step S118). The ID data and the time tag data are stored along with the corresponding player selection data (step S120).

Once the player selection data, the player ID data and the time tag data are stored, the data is sent to the game generator, directly or through a central station, via the network communication interface 39 (step S122). If the remote on-line vendor stations are connected directly to the game generator then data is sent to the game generator over the WAN. After the data is transmitted to the game generator, the remote station waits for the game generator to reply that it received the player selection and associated ID and time tag data (step S124). If the reply is that the data received was invalid (step S126, "NO"), the operator or player is notified that a transmission error occurred (step S128) and the station returns to the idle state (step S100). If the reply is that the data transfer is complete (step S126, "YES"), the player selection data and associated ID and time tag data are printed on the printer 34 to provide the player with a receipt of the transaction which can be used by the player to claim any winnings (step S130). After the receipt is printed, the station returns to the idle state (step S100).

Figure 6:
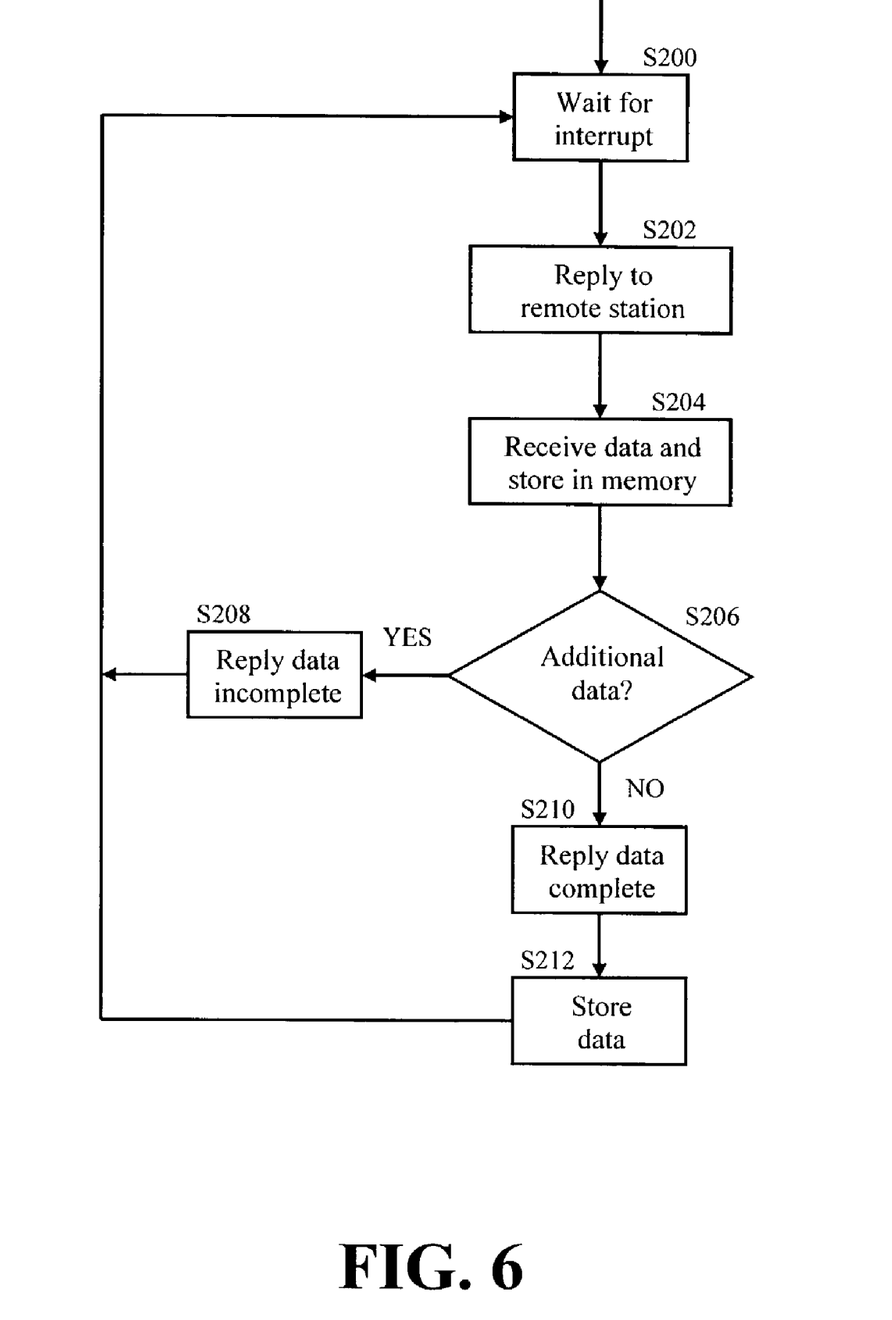
FIG. 6 is an exemplary flow diagram showing data transfer operation of the game generator of FIG. 2A or FIG. 2B to receive player selection data from a remote station.

FIG. 6 is an exemplary flow diagram of the transfer of data to the game generator. The game generator is initially in an idle state (step S200) and upon receiving an interrupt performs the desired routine. The interrupt may be a request from the remote station to send player selection data to the game generator. When the remote station requests data transfer, the game generator provides a reply indicating that the game generator is or is not ready to receive the data (step S202). When the game generator is ready to receive data, the remote station sends the data to the game generator which stores the data in the network communication interface memory (step S204). The network communication interface controller determines if the data transaction is complete (step S206). If the data transaction is incomplete (step S206, "NO"), the game generator replies to the remote station that the transaction is incomplete (step S208) and returns to the idle state (step S200). If the data transaction is complete (step S206, "YES"), the game generator replies that the transaction is complete (step S210) and transfers the player selection, the ID and the time tag data to the storage device 24 (step S212).

Figure 7:
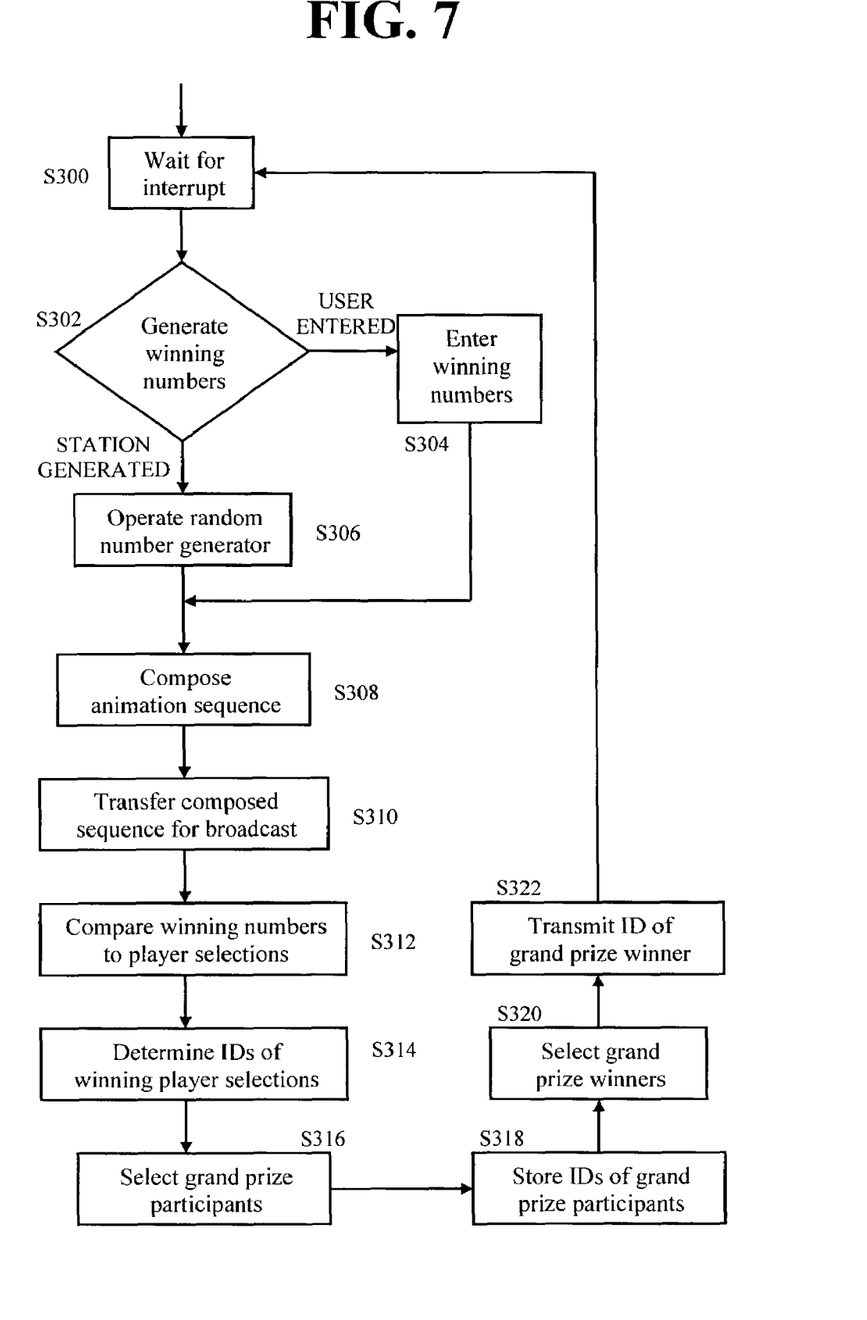
FIG. 7 is an exemplary flow diagram showing operation of the game generator of FIG. 2A or FIG. 2B to generate lottery results.

FIG. 7 is an exemplary flow diagram of the operation of the game generator for generating the lottery results. Initially, the game generator is in an idle state (step S300) and upon receiving an interrupt, for example, an operator selected start command, the generator determines what the winning numbers are for a particular game. The winning numbers can be randomly chosen and entered into the generator by an operator a keyboard or another input device (step S302, "USER ENTERED", and step S304), or generated by random number generator 25 (step S302, "STATION GENERATED", and step S306).

Once the winning numbers are obtained by the game generator, the controller 23 composes a video sequence having an outcome that corresponds to the randomly generated winning numbers (step S308). As discussed above, the video sequence is preferably a seamless composition of animation elements (and/or video segments) randomly selected for corresponding stages of the video sequence.

The composed video sequence is then transferred (step S310) via the network communication interface or the broadcast interface for broadcast, as described above. Before broadcasting the video sequence, the game generator compares the selected winning sequence of numbers to all the entries of player selection data (step S312) and determines the number of winners (step S314).

The game generator controller 23 then optionally determines which players qualify for the grand prize (step S316). As noted above in the horse racing example, one criterion for determining the grand prize participants is to select all of the players who selected the trifecta. Alternatively, all players of the game may qualify for the grand prize. The identities of the grand prize participants may be stored in, for example, a grand prize data table (step S318) and the winner of the grand prize may be randomly selected through operation of the random number generator 25 (step S320). After the winner of the grand prize is selected, the name of the winner is broadcasted (step S322).

Although the subject matter of the present disclosure is explained exemplarily above using a virtual ball draw and a racing game, it should be understood that the tools described herein may be adapted for other animated games, with randomly selected results, which reduce drawing costs while increasing entertainment value to lottery players, as well. For example, the animated game may be a Winning Hand game (or another playing card game) in which player select any combination of five cards from a deck of playing cards. After selection of game parameters (here, cards) is ended for a game, a "winning hand" of five cards is randomly selected, and portrayed in animation as, for example, the dealing of five cards which are then turned over one-by-one. In order to enhance player's belief that they may win a prize, prizes may be awarded for combinations of cards which do not match all of the cards in the winning hand (e.g., prizes may be awarded for combinations which match two or more cards in the winning hand).

As another example, the game may be a Lucky Date Game in which players select a month, a day of the month and a (two-digit) year. After selection of game parameters (here, dates), a winning month-day-year combination is randomly selected as the game winner, and portrayed in animation by, for example, flipping over a month tile, a day tile and a year tile, one at a time. The Lucky Date Game is popular with lottery players since many lottery players use important dates in their lives (for example, birthdays, anniversaries, etc.) to formulate their lottery numbers.

The game also may be animated versions of other popular games such as Bingo, etc., or licensed properties such as Battleship, Monopoly, etc.

Various modifications can be made to the embodiments of the present disclosure herein without departing from the spirit and scope thereof. For example, various types of network resources and protocols may be used for the wide area network and various central and remote station configurations may be employed. Likewise, various animation techniques may be used to animate the game through which the lottery winner is graphically portrayed, and various types of games may be adapted to animate the lottery game. Further, any of the animated lottery games may be combined with a video announcement of the game winner by a real person.

In addition, although the description of exemplary embodiments above refers to selection of numbers (as game parameters) and random selection of a winning combination of numbers, it should be apparent that the embodiments may be readily adapted for selection of other types of game parameters, such as character, letters, symbols, etc.

The above description should not be construed as limiting the disclosure, but merely as disclosing preferred embodiments thereof. Those skilled in the art can envision other modifications within the scope and spirit of the disclosure as defined by the claims appended hereto.

For example, additional variations may be apparent to one of ordinary skill in the art from reading U.S. application Ser. No. 09/900,235, filed Jul. 6, 2001, which is incorporated herein by reference.

What is claimed is:

1. A lottery system graphically portraying a lottery result in animation, comprising:
    a plurality of lottery terminals configured to provide lottery game parameters to a plurality of players for selection; and
    a game generator including a random number generator and an animation drawing subsystem, said animation drawing subsystem including a storage device,
    said random number generator configured to generate a plurality of randomly selected numbers for a candidate game event;
    said storage device comprising a plurality of different appropriate animation segments associated with each respective randomly selected number;
    said animation subsystem configured to build a video sequence for each candidate game event by randomly selecting one of said animation segments from said plurality of possible appropriate segments associated with each randomly generated number, and compiling all of the randomly selected animation segments corresponding to the respective randomly selected numbers into the video sequence;
    wherein the animated lottery game video is made available to the plurality of players.

2. The lottery system of claim 1, wherein the animation drawing subsystem retrieves selected graphical components from a library of animation elements, virtual images and/or recorded video images, and applies a compositing process to the selected graphical components to generate the animation segments corresponding to the plurality of randomly selected numbers.

3. The lottery system of claim 2, wherein each game event is associated with a plurality of combinations of the graphical components stored in the library of animation elements and virtual images, and the animation drawing subsystem selects for each selected game event one of the corresponding combinations.

4. The lottery system of claim 1, wherein the animated lottery game video includes overlay of one or more video segments with the animation segments.

5. The lottery system of claim 4, wherein the game generator further comprises a user interface.

6. The lottery system of claim 5, wherein the user interface provides means for managing and configuring a library of animation elements and virtual images.

7. The lottery system of claim 5, wherein to user interface provides means for customizing graphical components.

8. The lottery system of claim 5, wherein the user interface provides means for configuring and/or customizing a compositing process.

9. The lottery system of claim 5, wherein the user interface provides means for synchronizing voice overlays and/or audio tracks with animation sequences and/or video segments.

10. The lottery system of claim 5, wherein the game generator maintains an archive of lottery game results, and the user interface provides means for obtaining statistics and/or historical data from the archive.

11. The lottery system of claim 1, wherein the animated lottery game video includes one or more voice overlays and/or audio tracks.

12. The lottery system of claim 1, wherein the game generator maintains an archive of lottery game results and automatically stores the animated lottery game video in the archive.

13. The lottery system of claim 1, further comprising a lottery server, wherein the lottery server is coupled to the lottery terminals through one or more computer and/or telecommunicative networks.

14. The lottery system of claim 13, wherein the lottery server is coupled to the game generator to trigger to random selection of the lottery result by the random number generator.

15. The lottery system of claim 13, wherein the animated lottery game video is posted and available to the lottery terminals on demand through a computer or telecommunicative network.

16. The lottery system of claim 13, wherein the game generator further comprises a communication interface configured for communicating the animated lottery game video to the lottery terminal for display.

17. The lottery system of claim 1, wherein the animated lottery game is a virtual ball draw.

18. The lottery system of claim 1, wherein the animated lottery game video includes announcement of the lottery result by a real person in one or more recorded video segments.

19. The lottery system of claim 1, wherein the animated lottery game is an animated playing card game.

20. The lottery system of claim 1, wherein the animated lottery game is an animated lucky date game.

21. The lottery system of claim 1, wherein the animated lottery game is an animated race.

22. The lottery system of claim 1, wherein the animated lottery game is broadcasted.

23. The lottery system of claim 1, wherein a game controller concatenates the selected animation segments.

24. The lottery system of claim 23, wherein the concatenated animation segments are contiguous and seamless.

25. The lottery system of claim 1, wherein the animation segments include a plurality of graphic components, and a compositing process is repeatedly applied to the graphic components to produce the animation segments.

26. The lottery system of claim 1, wherein, at the predetermined time, the random number generator randomly selects the lottery result and then the animation drawing subsystem automatically compiles the animated lottery game video.

* * * * *